United States Patent
Hirschmann et al.

(10) Patent No.: US 9,650,255 B2
(45) Date of Patent: May 16, 2017

(54) REACTOR AND PROCESS FOR ENDOTHERMIC GAS PHASE REACTION IN A REACTOR

(71) Applicant: Wacker Chemie AG, Munich (DE)

(72) Inventors: Andreas Hirschmann, Ering (DE); Walter Haeckl, Zeilarn (DE); Uwe Paetzold, Burghausen (DE)

(73) Assignee: Wacker Chemie AG, Munich (DE)

( * ) Notice: Subject to any disclaimer, the term of this patent is extended or adjusted under 35 U.S.C. 154(b) by 526 days.

(21) Appl. No.: 14/031,156

(22) Filed: Sep. 19, 2013

(65) Prior Publication Data
US 2014/0105804 A1 Apr. 17, 2014

(30) Foreign Application Priority Data
Oct. 17, 2012 (DE) .......................... 10 2012 218 941

(51) Int. Cl.
*C01B 33/107* (2006.01)
*B01J 4/00* (2006.01)

(52) U.S. Cl.
CPC ............ *C01B 33/1071* (2013.01); *B01J 4/005* (2013.01); *B01J 2219/002* (2013.01); *B01J 2219/00063* (2013.01); *B01J 2219/00135* (2013.01); *B01J 2219/00159* (2013.01); *B01J 2219/00238* (2013.01)

(58) Field of Classification Search
CPC .................................................. C01B 33/1071
USPC .................................................. 423/341, 342
See application file for complete search history.

(56) References Cited

U.S. PATENT DOCUMENTS

| | | | | |
|---|---|---|---|---|
| 4,165,363 A | * | 8/1979 | Weigert | C01B 33/107 423/342 |
| 4,526,769 A | * | 7/1985 | Ingle | C01B 33/035 423/342 |
| 4,536,642 A | | 8/1985 | Hamster et al. | |
| 5,265,544 A | * | 11/1993 | Bigelow | F23G 7/001 110/238 |
| 2007/0073075 A1 | | 3/2007 | Paetzold et al. | |
| 2008/0112875 A1 | | 5/2008 | Garcia-Alonso et al. | |
| 2010/0264362 A1 | * | 10/2010 | Chee | B01J 8/0055 252/182.1 |
| 2011/0200512 A1 | | 8/2011 | Saiki et al. | |
| 2012/0151969 A1 | | 6/2012 | Lichtenegger et al. | |
| 2013/0287668 A1 | | 10/2013 | Ring et al. | |

FOREIGN PATENT DOCUMENTS

| | | |
|---|---|---|
| DE | 102011002749 A1 | 7/2012 |
| EP | 1770058 A1 | 4/2007 |
| EP | 1775263 A1 | 4/2007 |
| EP | 2368626 A1 | 9/2011 |
| KR | 20010099168 A | 11/2001 |

* cited by examiner

*Primary Examiner* — Ngoc-Yen Nguyen
(74) *Attorney, Agent, or Firm* — Caesar Rivise, PC

(57) ABSTRACT

The invention provides a process for endothermic gas phase reaction in a reactor, in which reactant gases are introduced into the reactor via a gas inlet apparatus and distributed homogeneously into a heating zone by means of a gas distribution apparatus, wherein the reactant gases are heated in the heating zone to a mean temperature of 500-1500° C. by means of heating elements and then conducted into a reaction zone, the reactant gases reacting in the reaction zone to give a product gas which is conducted out of the reactor via a gas outlet apparatus. Further subject matter of the invention relates to a process for endothermic gas phase reaction in a reactor, wherein the heating of the heating elements is controlled by temperature measurements in the reaction zone, at least two temperature sensors being present in the reaction zone for this purpose, and reactor for performance of the process.

2 Claims, 3 Drawing Sheets

REACTOR AND PROCESS FOR ENDOTHERMIC GAS PHASE REACTION IN A REACTOR

BACKGROUND OF THE INVENTION

The invention provides a reactor and a process for endothermic gas phase reaction in a reactor.

One example of such a reaction is the conversion of silicon tetrachloride (STC) with hydrogen to trichlorosilane (TCS) and HCl. The conversion of STC with hydrogen to trichlorosilane typically takes place in a reactor at high temperatures, at at least 600° C., ideally at at least 850° C. The relative selectivity is given by the molar proportion of trichlorosilane relative to silicon tetrachloride. It is a measure of how much of the STC used is converted to TCS and thus determines the economic viability of the process.

U.S. Pat. No. 4,536,642 A describes an apparatus and a process for conversion of silicon tetrachloride STC to trichlorosilane TCS.

The reactants are introduced into the vessel through the inlet and brought to temperature with the aid of the hot offgas within the three successive heat exchangers. The heating elements heat the reactants up to the final temperature within the reaction region of the converter. The reaction products are conducted together with the unreacted reactants in a pipe to the heat exchangers before they leave the converter again through the opening. The heat exchangers used consist of graphite.

Both the heating elements and the heat exchangers show an increased level of corrosion, which leads to failure of the reactor. Moreover, the heating elements are subject to greater or lesser corrosion by hydrogen, which can lead in the long term to failure of the reactor.

US 2008/112875 A1 describes a process for conversion of STC to TCS, in which particular attention is paid to the cooling rate of the process gas in the heat exchanger. For the heat exchangers, materials such as SiC, silicon nitride, quartz glass or SiC-coated graphite are used. These materials have the advantage that they react only to a limited degree with hydrogen, for example, and therefore reduce the above-described problems. However, they additionally exhibit the considerable disadvantage that the construction complexity is very high.

US 2013/0287668 A1 discloses a process for hydrogenating chlorosilanes in a reactor, wherein at least two reactant gas streams are introduced separately into a reaction zone, the first reactant gas stream including silicon tetrachloride being conducted through a first heat exchanger unit in which it is heated, and then being conducted through a heating unit, in the course of which it is heated to a first temperature before the first reactant gas stream reaches the reaction zone, and wherein the second reactant gas stream including hydrogen is heated by a second heat exchanger unit to a second temperature, the first temperature being greater than the second temperature, and then being introduced into the reaction zone, such that the mean gas temperature in the reaction zone is between 850° C. and 1300° C., and react to give product gases comprising trichlorosilane and hydrogen chloride, wherein the product gases obtained in the reaction are conducted through said at least two heat exchanger units and preheat the reactant gas streams of the reaction by the countercurrent principle, with flow first through the first heat dewexchanger unit and then through the second heat exchanger unit.

In addition, US 2013/0287668 A1 discloses a reactor for hydrogenation of chlorosilanes, comprising two gas inlet apparatuses through which the reactant gases can be introduced separately into the reactor, and at least one gas outlet apparatus through which a product gas stream can be conducted, at least two heat exchanger units which are connected to one another and which are suitable for heating reactant gases separately by means of the product gases conducted through the heat exchanger units, and a heating zone which is arranged between a first heat exchanger unit and a reaction zone and in which there is at least one heating element.

US 2013/0287668 A1 additionally describes a reactor for hydrogenation of chlorosilanes, comprising a vessel containing a shell face, a lower end and an upper end opposite the lower end, and at least one inlet apparatus for a reactant gas stream and at least one outlet apparatus for a product gas stream, at least one circular heating element or a plurality of heating elements arranged in a circle, at least four cylindrical deflecting devices for gas arranged concentrically in the vessel, suitable for deflecting gas flowing at the upper or lower end of the reactor, the radius of a first cylindrical deflecting device being greater and the radius of the at least three further deflecting devices being less than the radius of the circular heating elements or less than the radius of the circle on which the heating elements are disposed, at least one further inlet device for a reactant gas comprising nozzles mounted in a circle at the lower end of the vessel, the radius of the circle on which the nozzles are disposed being greater than the radius of one of the deflecting devices and less than the radius of a deflecting device adjacent to that deflecting device.

In the prior art, there is inhomogeneous attrition of the heating elements, and there are frequent reactor shutdowns because of failed heating elements. In the course of hydrogenation of chlorosilanes, a reduction in the conversion rate resulting from the failure of heating elements is additionally found.

The objective of the present application arose from these problems.

DESCRIPTION OF THE INVENTION

The object of the invention is achieved by a first process for endothermic gas phase reaction in a reactor, in which reactant gases are introduced into the reactor via a gas inlet apparatus and distributed homogeneously into a heating zone by means of a gas distribution apparatus, wherein the reactant gases are heated in the heating zone to a mean temperature of 500-1500° C. by means of heating elements and then conducted into a reaction zone, the reactant gases reacting in the reaction zone to give a product gas which is conducted out of the reactor via a gas outlet apparatus.

The object of the invention is also achieved by a second process for endothermic gas phase reaction in a reactor, in which reactant gases are introduced into the reactor via a gas inlet apparatus and conducted into a heating zone in which the reactant gases are heated to a mean temperature of 500-1500° C. by means of heating elements and then conducted into a reaction zone, wherein the heating of the heating elements is controlled by temperature measurements in the reaction zone, at least two temperature sensors being present in the reaction zone for this purpose, and the reactant gases reacting in the reaction zone to give a product gas which is finally conducted out of the reactor via a gas outlet apparatus.

The object of the invention is also achieved by a reactor for endothermic gas phase reactions, comprising at least one gas inlet apparatus for introduction of reactant gases into the reactor, and at least one gas outlet apparatus through which a product gas from the reactor can be conducted, a heating zone comprising heating elements for heating of the reactant gases, a reaction zone in which the reactant gases react to give product gas, optionally a gas distribution apparatus for homogeneous distribution of reactant gases in the reaction zone, and at least two temperature sensors within the reaction zone for determination of reaction temperatures.

In both processes, the reactant gases are preferably heated by means of at least two heat exchangers. The reactant gases are preferably heated analogously to US 2012/0151969 A1, a first reactant gas being heated by a first heat exchanger and a second reactant gas by a second heat exchanger.

The invention is based on the finding that, in such reactors according to the prior art, homogeneous gas flow through the entire heating zone was not assured because of the design. Inhomogeneous gas flows resulted in various regions having greater or lesser loading than others, which was observed through different wear/corrosion of the individual heating elements. On the basis of a damage probability diagram, it was possible to draw conclusions about the gas flows which exist in the heating and reaction zones.

The first process envisages a gas distribution apparatus for homogeneous distribution of reactant gas into the heating zone.

The gas distribution apparatus may be a gas distributor plate or a gas distributor screen. In its simplest execution, it is planar element with at least one orifice.

The gas distribution apparatus is preferably installed between heat exchanger and heating zone.

The gas distribution apparatus distributes reactant gases homogeneously over the entire cross section into the heating zone.

It was essential for the success of the invention to ensure that the gas distribution is homogeneous in all directions, and an approximately equal gas flow exists in all regions of the heating zone.

The gas distribution apparatus allows the flow rate of gas per heating element to be homogenized.

The "heating space" or all heating elements are loaded homogeneously.

The aging process and the wear to the heating elements is distributed homogeneously over the entire reaction cross section.

The probability of damage to the heating elements with installation of a gas distribution apparatus was reduced by 33%. This has a direct and positive effect on the service life achievable.

It has been found that incorporation of a gas distributor apparatus allows the average service life of the reactor to be increased by at least 30% compared to the prior art.

Equally, in the case of conversion of silicon tetrachloride and hydrogen, a rise in the conversion to trichlorosilane by 5% is found.

The second process is likewise suitable for achieving the object of the invention.

The reaction temperature in the reaction zone of the reactor is set by the heating of the heating elements.

The desired reactor temperature can be determined by means of a temperature sensor, for example of a thermocouple. By measuring the temperature in the reaction zone, a measurement signal is produced, which can be used for regulation of the heating elements in the heating zone.

It has now been found in the context of the invention that a slightly different position of the temperature sensor can lead to quite different measured temperatures in the reactor, which in turn can lead to unfavorable thermal conditions for the operation of the reactor. This is manifested, for example, in a reduced conversion rate and hence lower economic viability of the process.

The failure, for example, of one heating element at first causes a fall in the temperature in the reaction zone. This fall in the temperature is recognized by the temperature sensor and compensated for by a corresponding increase in the power of the remaining heating elements.

Locally, the remaining heating elements, however, have a higher surface temperature as a result of the increased power, and so there may be increased formation of by-products locally. This is associated with a decrease in the overall conversion rate, which in turn leads to a reduction in the economic viability of the process.

In the case of measurement of the temperature difference between several sites within the reaction zone of a reactor, it may be found that different temperatures are apparently present in the reaction zone even without disruptions such as heating element failures.

As well as different gas rates, different temperatures in the reactor are also caused by the design of the heating elements not being constant. There are both variations in the material quality and variations in the dimensions of the heating elements, irrespective of the design of the heating elements, which may comprise heating tubes, heating bars or heating elements in meandering form.

In order nevertheless to ensure the same conditions, the surface temperature of each and every heating element could be determined and regulated separately. Instead, the gas temperature is measured in the heating zone.

It is a feature of endothermic gas phase reactions that no transverse compensating flow is measurable as a result of the high laminar gas flow.

For the reaction, the gas phase is brought to or kept at temperature of preferably 500-1500° C., more preferably 700-1300° C., using active heating elements and those around which there is direct flow.

The gas flow from entry into the heating zone to the reaction zone proceeds from an outer arrangement (cylindrical or square) inward.

In this case, a group of the heating elements is mounted at the outer arrangement.

A further group of heating elements may also additionally be mounted in a middle arrangement.

The at least two temperature sensors are mounted only at the start of the reaction zone, and not in the heating zone.

According to the group, the arrangement of heating element groups may be circular, but also square or elliptical.

In order to enable a compact reactor design, gas deflection apparatuses in the heating region are advantageous. This also serves to increase the heating time and reaction time, since this results in an increase in the reaction space between heating element and gas temperature measurement. This serves, inter alia, also to reduce the energy losses.

The reaction in the reaction zone is followed by cooling of the process gases by introduction into a heat exchanger. This ends the gas phase reaction.

If there is now a failure of a heating element, the gas phase at the periphery of the heating element is not heated directly by means of the heating elements but merely via the radiation emitted from the components (for example the gas deflection apparatuses).

This is not as effective as direct contact with very much hotter heating element surfaces.

Since there is additionally no transverse compensating flow, this only slightly heated gas reaches the temperature sensors where the temperature is measured.

It was found that every heating element failure is recognizable directly at the respective temperature sensors through a drop in temperature in the heating zone.

In other words, in the event of failure of individual heating elements, the reactor temperature falls in the direct environment of the failure by up to 50 K, and hence also the chemical conversion and the yield there, which has an adverse effect on the overall conversion of the reactor.

If a plurality of temperature measurements—at least two—are undertaken in the reaction zone, the failures can be assigned exactly to the particular temperatures.

If the reactor temperature is used for regulation of the reactor, it should be ensured that, irrespective of failures and properties of the heating elements, an identical temperature constant within the heating space is present, and hence identical conditions prevail overall in the heating and reaction zone.

This can be accomplished by regulating the reactor temperature of the gas phase reaction by undertaking at least two temperature measurements in the reaction zone, with subsequent calculation of a regulation temperature from the temperature measurements.

The regulation temperature used is preferably the mean formed from all the temperature measurements.

The calculation of the regulation temperature may take into account geometric properties of the reactor and/or of the heating zone or arrangement of the temperature sensors in the reactor, by weighting the individual temperatures differently in the temperature regulation calculation.

The mean calculation has shown that the particular deviations from the desired reaction temperature can be reduced within the reaction zone.

This temperature drop directly after failure of the heating element has been compensated by increasing the power of the remaining heating elements in a correspondingly abrupt manner, in order that the reactor temperature remained at a constant temperature level. This meant, however, that a heating element failure caused the reaction temperature at the other heating elements to be increased by up to 50 K, and higher temperatures—as described above—promote the formation of by-products, which is undesirable.

Equally, an increase in the individual power to the heating elements leads to increased load on the heating elements, which in the worst case leads to increased corrosion at the heating elements and to further heating element failures.

If, in the course of the reactor run, a further heating element within the same temperature sensor fails, there is an increase in the temperature difference between the individual temperature sensors by a further up to 50 K.

The probability that the heating elements will prematurely become defective and/or fail is crucial to the overall service life of the reactor.

Preferably, the mean deviation from the mean of the temperatures measured at the temperature sensors is therefore not more than 50 K.

BRIEF DESCRIPTION OF THE DRAWINGS

The invention will be described in conjunction with the following drawings, wherein.

LIST OF REFERENCE NUMERALS

Figure 1:
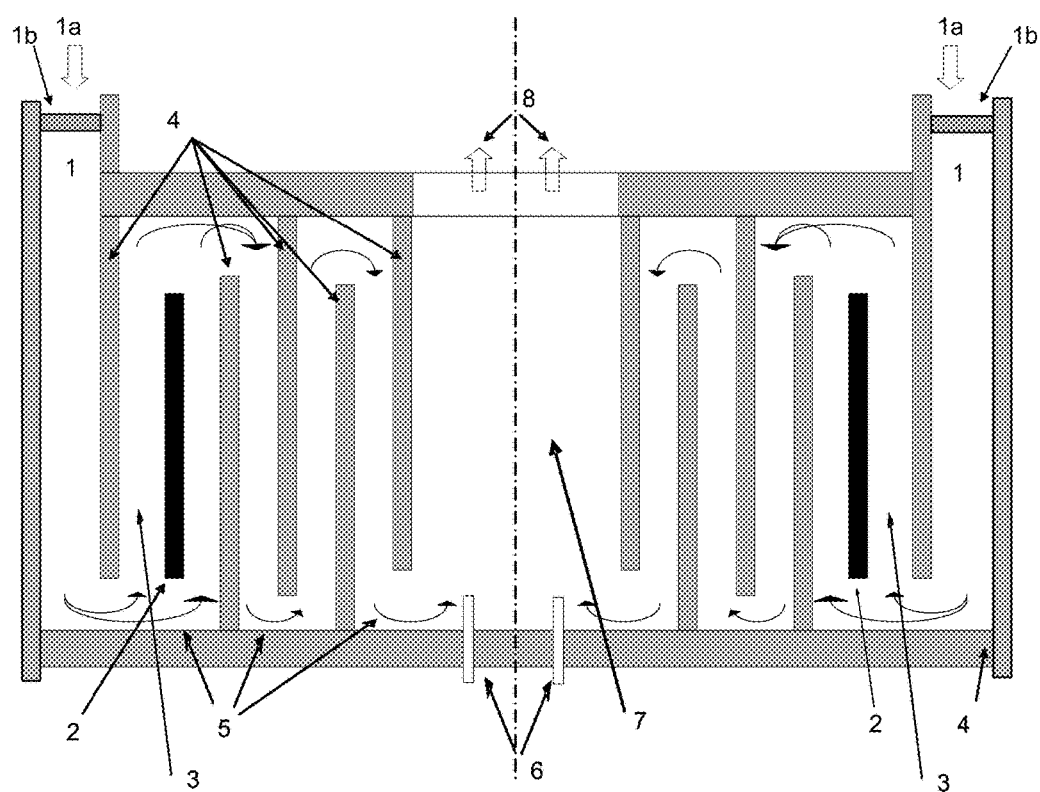
FIG. 1 shows a cross-sectional schematic view of an apparatus suitable for performance of the inventive process.

1 gas feed including gas supply 1*a* and distributor apparatus 1*b*
2 heating elements
3 heating zone
4 deflecting apparatus
5 gas conduit
6 two temperature measurement devices
7 reaction zone
8 gas outlet The invention relates in general terms to endothermic gas phase reactions.

The examples which follow relate to the conversion of silicon tetrachloride to trichlorosilane.

EXAMPLES

Example 1 (Comparative Example)

For the comparative example, a reactor according to U.S. Pat. No. 4,536,642 was used.

A gas mixture in the reactant stream consisting of 33 mol % of silicon tetrachloride and 67 mol % of hydrogen was used. The inlet temperature of the reactant gas stream was about 175° C.

The pressure was set to 6 bar and the temperature of the gas in the reaction zone to 1000° C.

After the reaction, the product gas was analyzed in a gas chromatograph, and the proportions of trichlorosilane and silicon tetrachloride were determined. The temperature of the exiting product gas stream was about 350° C.

The relative selectivity is given by the molar proportion of trichlorosilane relative to silicon tetrachloride.

For the sake of simplicity, the relative selectivity attained in the comparative example is defined as 100% if all heating elements are working.

Figure 2:
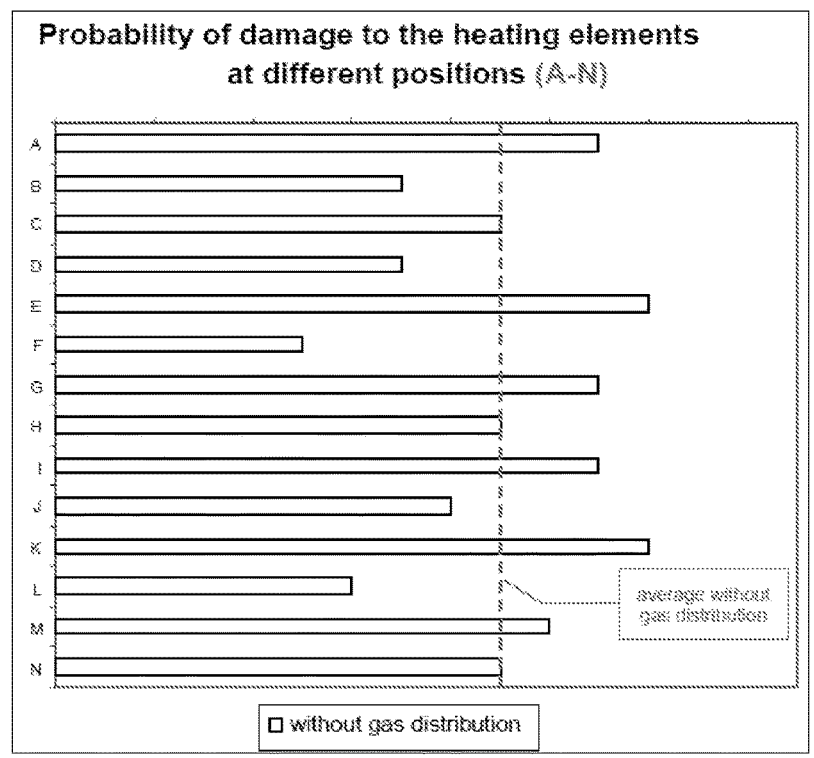
FIG. 2 is a bar graph of damage probabilities without gas distribution.

FIG. 2 shows the relative probability of damage to the individual heating elements (A-N) as a function of the heating element number for the comparative example.

It is clear that the spatial distribution of the occurrence of damage to the heating elements apparently does not obey any recognizable laws.

This constitutes the prior art.

If at least one heating element has failed, the power of the remaining functioning heating elements is regulated such that the target temperature which is measured in the middle of the reaction zone with a temperature sensor is maintained.

However, it was found that, even in the event of one failed heating element, the relative selectivity falls to about 97%.

The occurrence of by-products has risen by 3%.

Example 2

In Example 2, essentially the same boundary conditions are used as in Example 1.

However, the gas supply is distributed better into the heating zone using a gas distribution apparatus.

The gas distribution apparatus homogenizes the gas stream fed in over different gas passage dimensions along the gas feed into the cylindrical heating zone.

Figure 3:
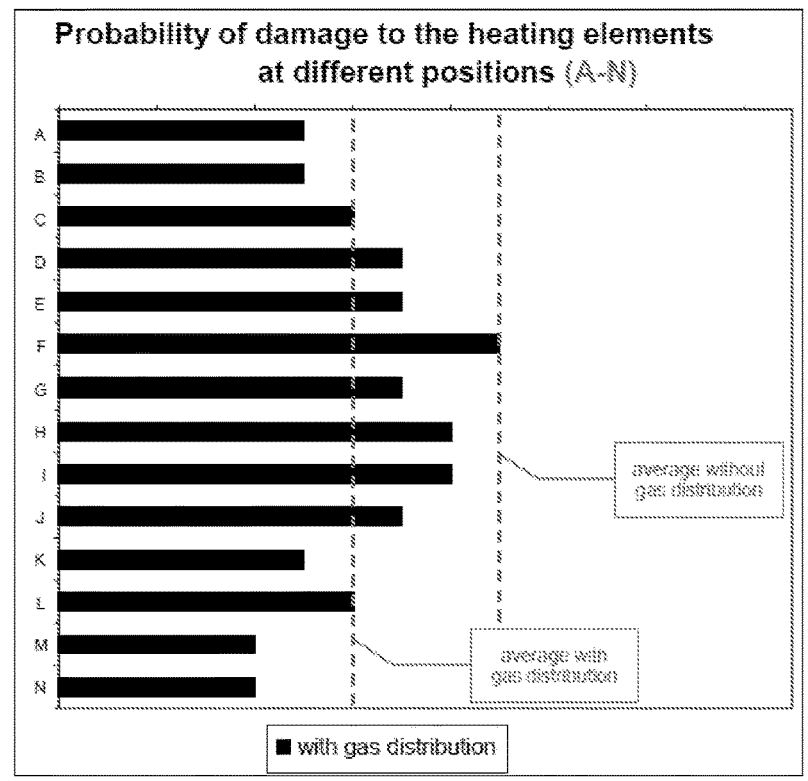
FIG. 3 is a bar graph of damage probabilities with gas distribution.

FIG. 3 shows a distinct improvement in the probability of damage resulting from the incorporation of a gas distribution apparatus.

The random cases of damage are altered to become a systematic distribution.

FIG. 3 additionally shows an inhomogeneous but systematic distribution of the gas phase supplied.

The relative probability of damage to the heating elements is reduced and the reactor can be operated for longer.

By virtue of the now systematic gas distribution, it is possible by further optimization steps to adjust and further improve the apparatus for better gas distribution according to the geometry of each individual reactor.

This can be accomplished by further adjusting the dimensions of the distribution apparatus.

Figure 4:
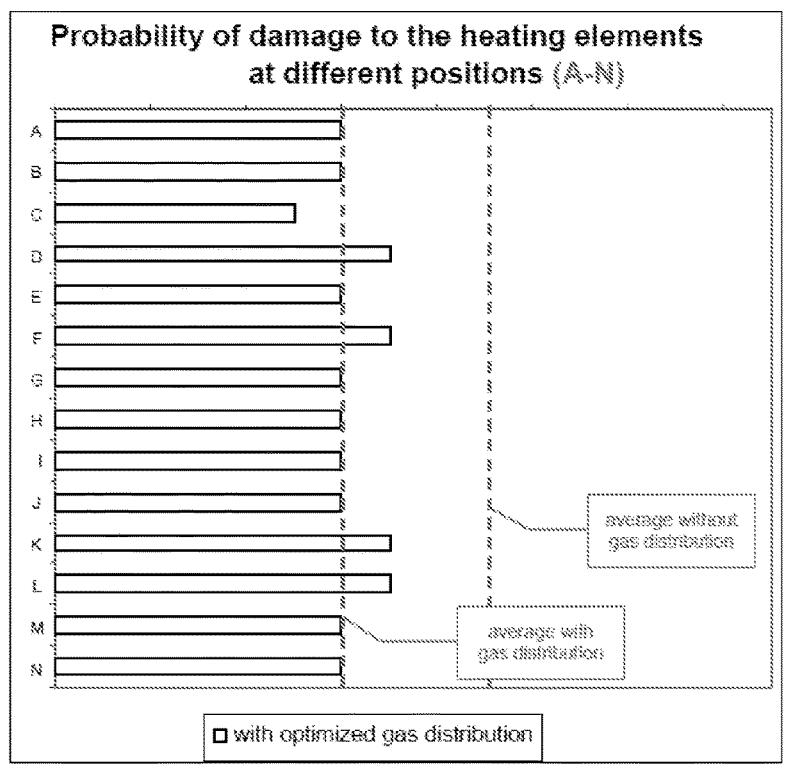
FIG. 4 is a bar graph of damage probabilities with optimized gas distribution.

FIG. 4 shows the optimized probability of damage to the heating elements, which is distributed homogeneously over each element.

In contrast to FIG. 3, however, no reduction in the number of instances of damage is discernible.

This optimized damage distribution has to be established individually for every reactor and shows the systematic representation here.

Figure 5:
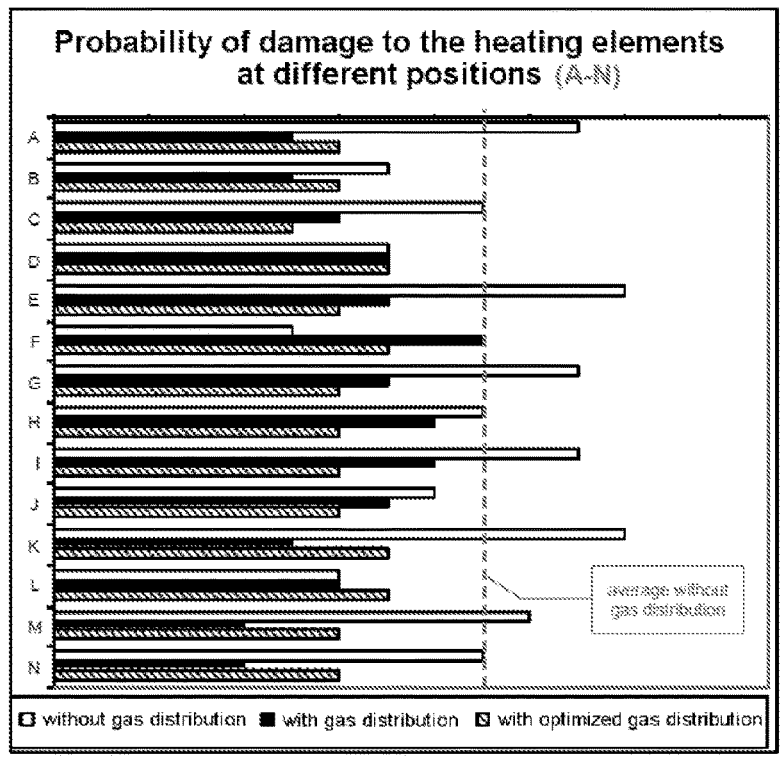
FIG. 5 is a bar graph showing the data of FIGS. 2-4 on a single graph.

FIG. 5 shows the direct comparison of the different probabilities of damage.

The relative probability of damage to the heating elements is reduced and the reactor can be operated for longer.

Example 3

In Example 3, essentially the same boundary conditions are used as in Example 1.

However, the reaction zone is equipped with an additional four temperature measurement devices, such that it is possible to additionally measure the temperature in the reaction zone in a spatially resolved manner.

The temperature measurement devices are arranged radially around the centre of the base plate within the reaction zone.

FIG. 1 shows, by way of example, the position of two of these additional temperature measurement devices 6.

If the determination of the temperature is carried out not as described in Example 1 with only one temperature measurement device but with the mean of all the values from the available temperature measurement devices, it is found that, in the event of failure of a heating element, the relative selectivity falls only to 99.5%, since the direct influence of temperature on the regulation temperature is reduced.

The unwanted by-products from an increased reaction temperature occur only up to 0.5%.

Example 4

In Example 4, in addition to Example 2, the heating elements are regulated such that the deviation of the temperatures measured at the heating elements from the mean $\Delta T$ is at a minimum.

This is done at every time point.

It has been found that, even when all heating elements are working, there can be significant differences in the temperatures.

The reason for this is probably the geometry of the heating zone (and hence the gas flow) and/or the geometry of the heating elements.

If a $\Delta T$ of less than 50 K is set when all the heating elements are working, a relative selectivity of 110% compared to Example 1 can be achieved.

Even if one heating element is no longer working, a relative selectivity of 107% compared to Example 1 is still achieved.

Here too, the relative probability of damage to the heating elements is reduced.

The service life, the conversion and the reliability of the reactor can be distinctly prolonged or increased as a result.

What is claimed is:

1. A process for converting silicon tetrachloride to trichlorosilane in a reactor, said method comprising the following steps:
    (a) providing the reactor comprising: (i) a gas inlet apparatus; (ii) a gas distribution apparatus selected from the group consisting of a gas distributor plate and a gas distributor screen; (iii) a heating zone comprising heating elements; (iv) a reaction zone; (v) at least two temperature sensors provided in the reaction zone and not in the heating zone, wherein the at least two temperature sensors are spatially resolved from each other; and (vi) a gas outlet apparatus;
    (b) introducing reactant gases into the reactor via the gas inlet apparatus;
    (c) homogeneously distributing with the gas distribution apparatus the reactant gases into the heating zone;
    (d) heating the reactant gases with the heating elements in the heating zone to a mean temperature of 500-1500° C.;
    (e) conducting the reactant gases from the heating zone into the reaction zone;
    (f) reacting the reactant gases in the reaction zone, wherein the reactant gases are silicon tetrachloride and hydrogen, which react at a temperature of at least 600° C. to give a product gas comprising trichlorosilane and HCl;
    (g) acquiring temperature measurements from the at least two temperature sensors in the reaction zone;
    (h) controlling the heating of the heating elements based on temperature measurements acquired in the reaction zone; and
    (i) conducting the product gas out of the reactor via the gas outlet apparatus,
    wherein a mean deviation of temperatures determined at the temperature sensors from a mean thereof is not more than 50 K.

2. The process as claimed in claim 1, wherein at least one heat exchanger is provided, which heats reactant gas by a countercurrent principle by use of product gas produced in the reaction, the gas distribution apparatus being arranged between the at least one heat exchanger and the heating zone.

* * * * *